US009639718B2

(12) United States Patent
Ahn (10) Patent No.: US 9,639,718 B2
(45) Date of Patent: May 2, 2017

(54) USB LINK LOCK DEVICE

(71) Applicant: Chang Hoon Ahn, Gyeongsu-Daero (KR)

(72) Inventor: Chang Hoon Ahn, Gyeongsu-Daero (KR)

(73) Assignee: Chang Hoon Ahn, Anyang (KR)

( * ) Notice: Subject to any disclaimer, the term of this patent is extended or adjusted under 35 U.S.C. 154(b) by 52 days.

(21) Appl. No.: 14/815,674

(22) Filed: Jul. 31, 2015

(65) Prior Publication Data

US 2015/0339498 A1 Nov. 26, 2015

Related U.S. Application Data

(63) Continuation of application No. PCT/KR2014/012410, filed on Dec. 16, 2014.

(30) Foreign Application Priority Data

Dec. 17, 2013 (KR) .................. 10-2013-0157613
May 16, 2014 (KR) .................. 10-2014-0059066

(51) Int. Cl.
*H01R 13/639* (2006.01)
*H01R 24/62* (2011.01)
*G06F 21/83* (2013.01)
*G06F 21/85* (2013.01)

(52) U.S. Cl.
CPC .............. *G06F 21/83* (2013.01); *G06F 21/85* (2013.01)

(58) Field of Classification Search
CPC .... H01R 13/639; H01R 13/633; H01R 24/62; H01R 13/6397; H01R 2201/06; H01R 13/6395; G06F 21/85

USPC .................. 439/352, 357, 368, 373
See application file for complete search history.

(56) References Cited

U.S. PATENT DOCUMENTS

| 7,934,939 B2 * | 5/2011 | Chen ................... H01R 13/639 439/352 |
| 8,968,021 B1 * | 3/2015 | Kennedy ............ H01R 13/6273 439/352 |
| 2006/0014413 A1 * | 1/2006 | Annecke ............ H01R 13/6275 439/352 |

(Continued)

FOREIGN PATENT DOCUMENTS

| KR | 10-2011-0077235 A | 7/2011 |
| KR | 20-2013-0005401 U | 9/2013 |
| KR | 10-1323364 B1 | 10/2013 |

*Primary Examiner* — Gary Paumen
(74) *Attorney, Agent, or Firm* — Mintz Levin Cohn Ferris Glovsky and Popeo, P.C.; Kongsik Kim; Colleen H. Witherell (57) ABSTRACT

Provided is a USB link lock device. The device includes a device body, a blocking member provided on the device body to block access of an external device, an external USB port part provided on the device body to be adjacent to the blocking member, a signal connection part enabling signal transmission between a terminal inside the USB port and the external USB connecting port, a locking member selectively locked to the electronic device so that the blocking member is not forcedly removed from the USB port, a stopping member provided in the device body to be retractable into the external USB port part, a lock member movably provided on the blocking member to control a locking operation of the locking member and a blocking operation of the stopping member.

9 Claims, 9 Drawing Sheets

(56) References Cited

U.S. PATENT DOCUMENTS

2006/0223355 A1* 10/2006 Hirschmann ........ H01R 13/639
439/352

* cited by examiner

USB LINK LOCK DEVICE

CROSS-REFERENCE TO RELATED APPLICATIONS

This application is a continuation of International Application No. PCT/KR2014/012410 filed on Dec. 16, 2014, which claims priority to Korean Application No. 10-2013-0157613 filed on Dec. 17, 2013 and Korean Application No. 10-2014-0059066 filed on May 16, 2014. The applications are incorporated herein by reference.

TECHNICAL FIELD

The present invention generally relates to a USB link lock device. More particularly, the invention relates to a USB link lock device, which is capable of locking and unlocking a USB port in a physical method so as to prevent data loss, virus infection and the like through a USB memory device.

BACKGROUND ART

With the development of industry and technology, the use of personal computers has rapidly increased and most institutes such as companies or government offices handle affairs using personal computers (including notebook PC), and control in various fields including machines and factory equipment, industrial facilities, military facilities, or the like is performed using computers.

Since computer use has become widespread in industry, damage frequently occurs due to the malicious infection of malicious codes or viruses into targeted computers, and loss of important information may occur thereby.

In view of the circumstances, various measures have been proposed to prevent the loss of information in offices, companies, government agencies, military facilities, or the like and to protect against the infection of the viruses or the like. However, recently, the universal application of USB ports together with the development of a memory device has enabled computers to be easily accessed, has enabled third parties to easily access a main computer and thereby frequently infect the computer with viruses and/or to steal important information.

In other words, most computers currently on the market are equipped with at least one or more universally connectable USB ports. Thus, it is possible for anyone to easily access a desired computer by connecting a USB memory device to the USB port.

Thus, an outsider as well as an insider may easily infect a computer with viruses and/or steal information by connecting a USB memory device to a computer. Accordingly, measures for preventing these problems are urgently needed.

Further, it is necessary to actively prevent USB memory devices other than pre-authorized USB memory devices from being inserted into a keyboard or mouse connection port, as well as the USB port, thus allowing only pre-authorized USB devices to be used.

SUMMARY

Accordingly, the present invention has been made keeping in mind the above problems occurring in the related art, and is intended to provide a USB link lock device, which is configured to physically block a USB port of a computer device, thus essentially preventing information leakage as well as virus infection through a USB memory device.

In an aspect, the present invention provides a USB link lock device, including a device body; a blocking member provided on the device body, and insertively coupled to an USB port of an electronic device to block access of an external device; an external USB port part provided on the device body to be adjacent to the blocking member, an external USB connection port being insertively coupled to the external USB port part; a signal connection part enabling signal transmission between a terminal inside the USB port of the electronic device into which the blocking member is inserted and the external USB connecting port inserted into the external USB port part; a locking member selectively locked to the electronic device so that the blocking member is not forcedly removed in a state of being inserted into the USB port of the electronic device; a stopping member provided in the device body to be retractable into the external USB port part, and selectively blocking an unauthorized external USB connecting port from being inserted into the external USB port part; and a lock member movably provided on the blocking member, and interfering with the locking member depending on a moving position to control a locking operation of the locking member, supporting the stopping member to change a posture of the stopping member depending on the moving position and thereby control a blocking operation of the stopping member.

The blocking member may preferably include a port insertion part provided on a first end thereof to protrude out from the device body and having a shape corresponding to that of the USB port of the electronic device to be inserted into the USB port of the electronic device; and a guide part extending from the port insertion part and provided in the device body, with the lock member movably installed therein to be retractable through a second end.

Further, the external USB port part may be provided in the device body to be spaced apart from the blocking member, and may have an elastic support piece elastically supporting the external USB connection port that enters therein, and a passing hole may be formed in the external USB port part to allow the stopping member to enter therein.

Further, the locking member may be integrally connected to the blocking member to be elastically deformable and restorable, and may have a locking protrusion that is interfered with and deformed by a movement of the lock member, in a state where the port insertion part is inserted into the USB port of the electronic device, and may be protruded out of the port insertion part to be locked to a locking hole formed in the USB port of the electronic device.

Further, a first end of the stopping member may be rotatably connected to the lock member, and a second end of the stopping member may be changed in posture when the lock member is inserted and then be moved to an internal space of the external USB port part, thus blocking a unauthorized external USB connection port from being inserted into the external USB port part.

The stopping member may include a rotary member rotatably connected at a first end thereof to the lock member and bent at a second end thereof at a predetermined angle towards the external USB port part; and a movable member retractably provided on the second end of the rotary member, and entering an interior of the external USB port part.

The movable member may include a guide pipe inserted into a coupling hole formed in the second end of the rotary member; a blocking pin provided to be movable into and out of the guide pipe; and a spring provided in the guide pipe to bias the blocking pin and thereby cause the blocking pin to protrude out from the guide pipe.

Further, the signal connection part may include a first internal structure provided in the blocking member; a second internal structure provided in the external USB port part; first and second connection terminals embedded in the first and second internal structures, respectively; and a terminal connecting member extending from the external USB port part to the blocking member to connect the first and second connection terminals to each other.

Further, the terminal connecting member may include an FPC cable.

The lock member may include a frame retractably provided to slide in and out of the blocking member; an internal space provided in the frame and rotatably supporting the rotary member; and a locking-member interference member supported at a first end thereof between the internal structure and the frame, and extending at a second end thereof out of the frame, the locking-member interference member interfering with the locking member to be locked to an interior of the USB port of the electronic device when the lock member is inserted into the blocking member.

Further, a rotating shaft to which the first end of the stopping member may be rotatably connected may be formed on the internal structure of the lock member, and a passing hole through which the stopping member passes may be formed in the frame.

The USB link lock device may further include a guide cover coupled to cover the blocking member to guide a movement of the lock member and having a guide hole through which the stopping member connected to the lock member passes, wherein the stopping member may rotatably come into contact with the guide part that is an edge of the guide hole when the lock member is inserted into the blocking member, and then may enter the USB port part.

As described above, a USB link lock device according to the present invention is advantageous in that it is possible to physically block a USB port of an electronic device, thus essentially preventing virus infection and the loss of important information by an external intruder.

Further, since it is impossible to release a lock member unless a release key unit for taking out the lock member inserted into a USB port to block it is used, separation is impossible from the USB port of an electronic device. If an allowed external USB connection port is previously connected to an external USB port part provided on a link lock device and then is connected to the electronic device to lock it, an unauthorized external USB connection port cannot be connected after the allowed external USB connection port is separated.

Thus, when outside personnel for maintenance and development access an electronic device or a server having a confidential document, an external USB terminal is connected via only an authorized port (external USB port) and then is converted into a lock state. In such a state, disconnection is impossible without an inherent release key unit. Thus, it is possible to control the illegal approach of outside personnel. That is, if the external USB terminal is connected to the PC or the server of protective equipment via the USB link lock device of the present invention, and the USB link lock device of the present invention is connected to a USB port of a notebook computer or other portable data media connected to an opposite side, the separation of the USB port is possible only when an administrator performs a releasing operation with the release key unit.

Therefore, after an outsider disconnects an authorized external USB connection port connected to an external USB port from an electronic device, it is impossible to connect the external USB connection port (a unauthorized USB memory device) to an external USB port part, thus essentially preventing illegal access to an electronic device.

DETAILED DESCRIPTION

Hereinafter, a USB link lock device according to an embodiment of the present invention will be described in detail with reference to the accompanying drawings.

Referring to FIGS. 1 to 6, the USB link lock device 300 according to an embodiment of the present invention includes a blocking member 310, an external USB port part 320, a signal connection part 330, a locking member 340, a stopping member 350, a lock member 360, and a device body 370.

Here, the device body 370 is provided with first and second casings 371 and 372 that are separated from and coupled with each other. A blocking member 310, an external USB port part 320, a signal connection part 330, a locking member 340, a stopping member 350, and a lock member 360 are accommodated between the first and second casings 371 and 372. First and second through holes 370a and 370b are vertically formed in a front surface of the device body 370. The blocking member 310 is retractably installed in the first through hole 370a, while the external USB port part 320 is installed in the second through hole 370b to be exposed to an outside. The first and second through holes 370a and 370b are formed to be spaced apart from each other in a vertical direction. Further, a third through hole 370c is formed in a rear surface of the device body 370 in such a way that the blocking member 310 protrudes out to be exposed to the outside. The device body 370 may be injection molded using a resin material.

Figure 1:
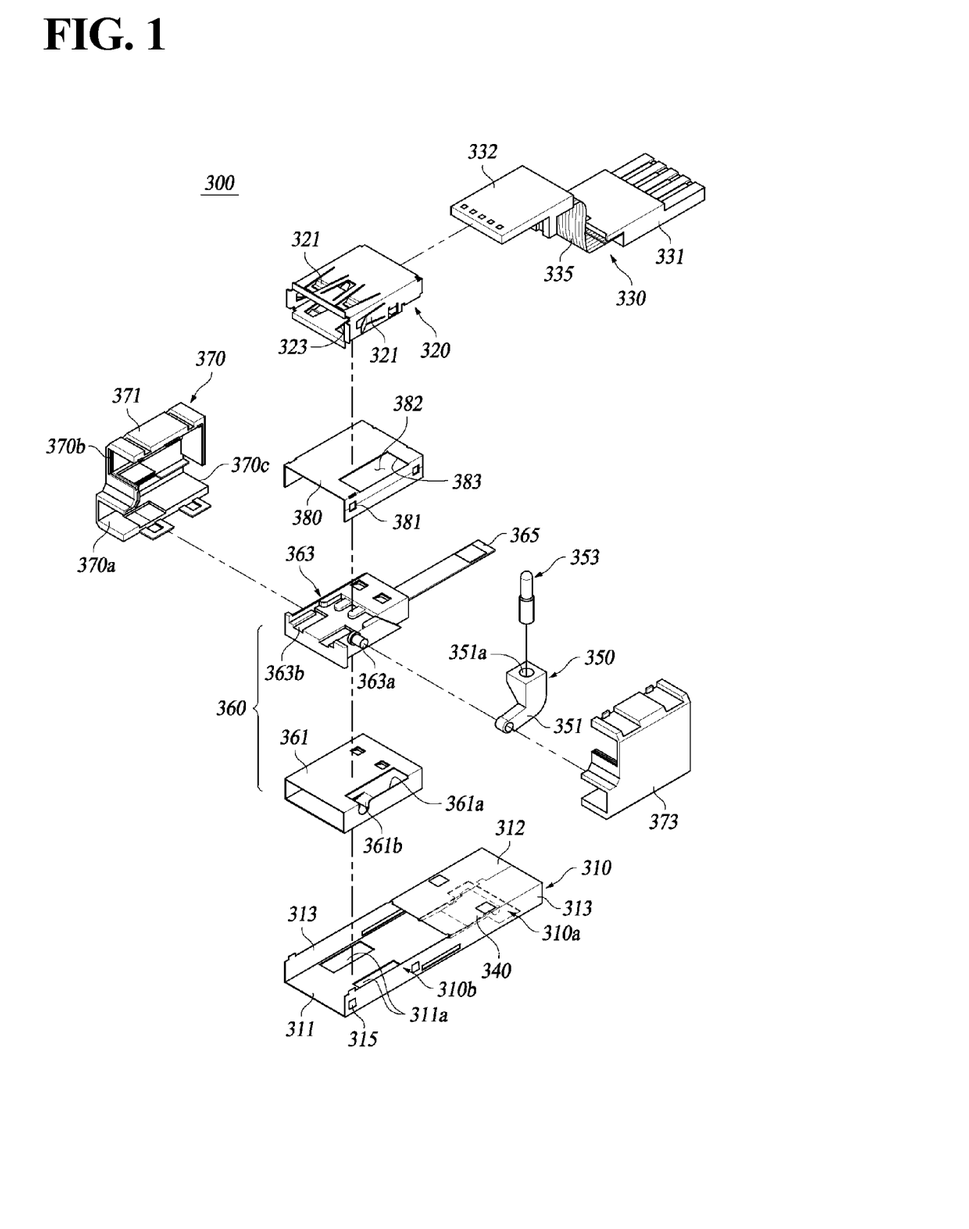
FIG. 1 is an exploded perspective view showing a USB link lock device according to an embodiment of the present invention.
Figure 2:
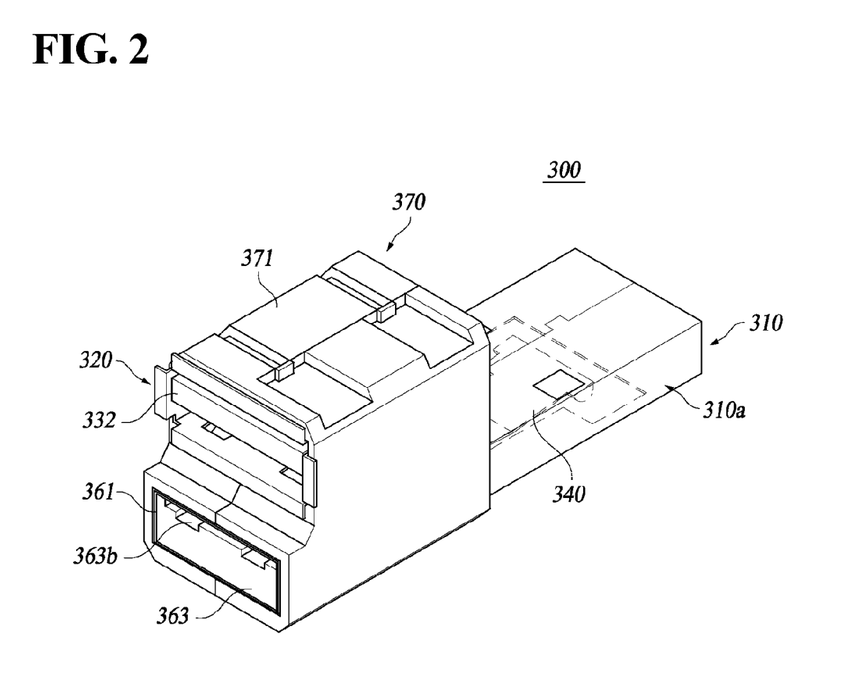
FIG. 2 is a perspective view showing the assembled state of the USB link lock device of FIG. 1.
Figure 3:
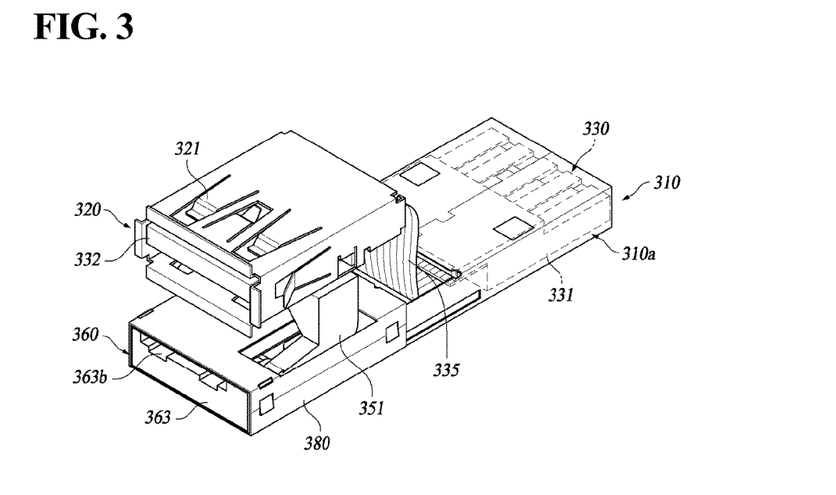
FIG. 3 is a perspective view showing a state where a device body is removed from the state of FIG. 2.
Figure 4:
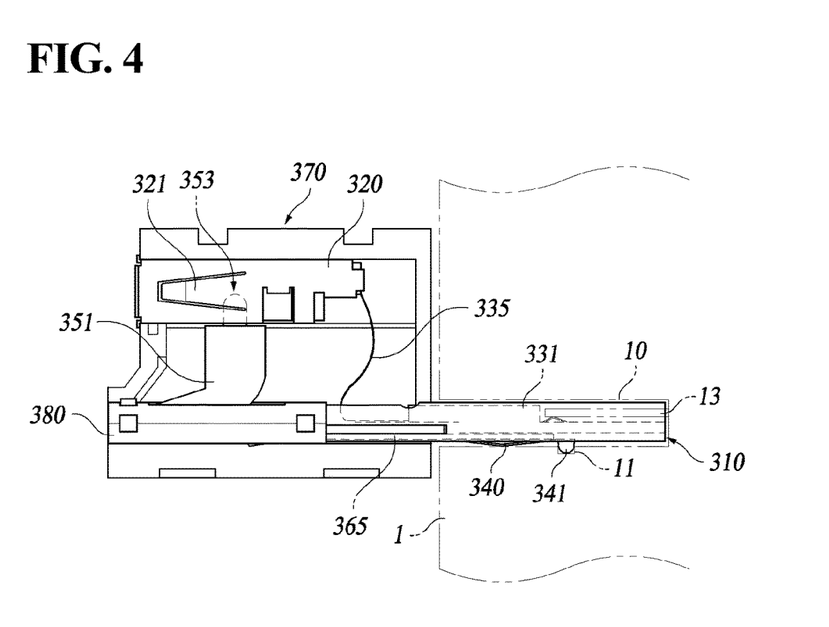
FIG. 4 is a side view showing a state where the USB link lock device of FIG. 2 is coupled to a USB port of an electronic device.

As shown in FIG. 4, the blocking member 310 is insertively coupled to a USB port 10 of an electronic device 1 to block the access of an external device, and has the shape of a rectangular frame that is hollow therein, with the blocking member being open at both ends thereof. Specifically, the blocking member 310 has a lower surface 311, an upper surface 312, and both side surfaces 313, and is open at both ends thereof. The lock member 360 may be mounted in the blocking member 310 via an opening 314 that is an open portion of the upper surface 312.

The locking member 340 is integrally formed on the lower surface 311. That is, the locking member 340 is integrally formed to have elasticity by cutting a portion of the lower surface 311, and a portion of the locking member 340 is bent, with an outwardly protruding locking protrusion 341 being provided on an end of the locking member 340. When the blocking member 310 is inserted into the USB port 10 of the electronic device 1, the locking protrusion 341 may be inserted into the locking hole 11 defined in the USB port 10 to be locked thereto. The locking and unlocking operations of the locking member 340 are controlled by the lock member 360, and will be described later in detail.

A pair of guide holes 311a is formed in the lower surface 311 to be parallel to each other, and serves to limit the reciprocating distance of the lock member 360.

The blocking member 310 configured as such has a port insertion part 310a that is provided on a first end thereof to protrude out from the device body 370 while being supportedly coupled thereto and then is inserted into the USB port 10 of the electronic device, and a guide part 310b that extends from the port insertion part 310a and is located in the housing 301 to guide the movement of the lock member 360. The port insertion part 310a has a size and a shape corresponding to those of the USB port 10 of the electronic device 1.

The external USB port part 320 is spaced apart from the blocking member 310 by a predetermined distance to be parallel to the blocking member 310, thus allowing an external USB memory device or a USB connection port 410 to be insertively coupled thereto. Here, the external USB connection port 410 may be an USB port for connecting a mouse or a keyboard. Such an external USB port part 320 is mounted in the device body 370 to be superposed on the blocking member 310. The external USB port part 320 may have the shape of a rectangular frame that is open at both ends to allow the external USB connection port 410 to enter, and may be made of a metal material to be integrated with the blocking member 310. However, according to this embodiment, the external USB port part 320 is separately placed and then is mounted in the device body 370.

Further, the external USB port part 320 includes a plurality of elastic support pieces 321 to elastically support the external USB connection port 420 that enters therein. A passing hole 323 through which the stopping member 350 passes is formed in a surface facing the blocking member 310 of the external USB port part 320.

The signal connection part 330 enables signal transmission between a terminal 13 inside the USB port 10 of the electronic device 1 into which the blocking member is inserted and the external USB connecting port 410 inserted into the external USB port part 320. Such a signal connection part 330 includes a first internal structure 331 installed in the blocking member 310, a second internal structure 332 installed in the external USB port part 320, first and second connection terminals 333 and 334 provided in the first and second internal structures 331 and 332, respectively, and a terminal connecting member 335 connecting the first and second connections terminals 333 and 334 to each other.

The first internal structure 331 is installed in the port insertion part 310a of the blocking member 310, with the first connection terminal 333 being installed therein. The second internal structure 332 is fixedly installed in the external USB port part 320, with the second connection terminal 334 being installed therein.

The connecting member 335 is connected at a first end thereof to the first connection terminal 333, and is connected at a second end thereof to the second connection terminal 334 to enable the signal transmission. The connecting member 335 is preferably a FPC cable. Thus, this can easily connect the first and second internal structures 331 and 332 to each other regardless of a position, a distance and a space.

Figure 5A:
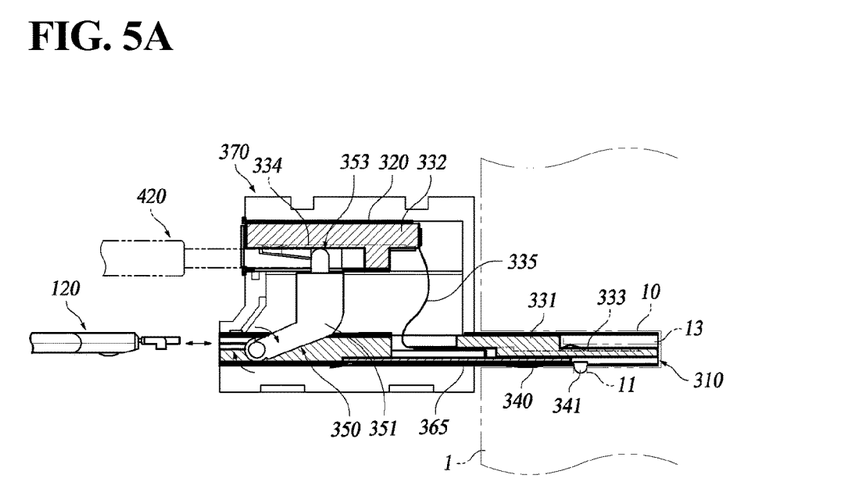
FIG. 5A is a sectional view showing the USB link lock device of FIG. 4.
Figure 6:
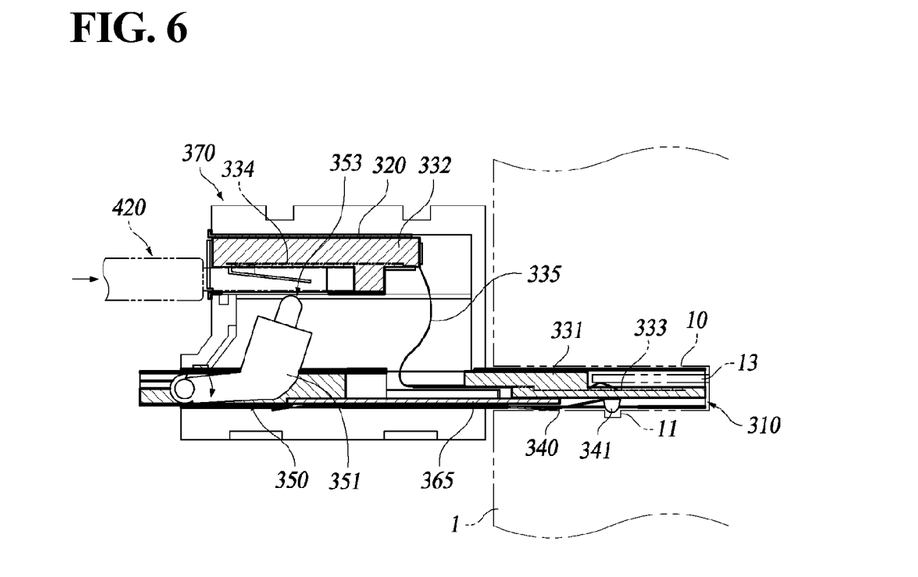
FIG. 6 is a sectional view showing a state where a lock member is removed from a blocking member in FIG. 5A.

As shown in FIGS. 4 and 5A, the locking member 340 is installed to be selectively locked to the electronic device 1 so as to prevent the inserted blocking member 310 from being forcedly removed from the USB port 10 of the electronic device 1. Such a locking member 340 may be formed integrally with the blocking member 310. A free end of the locking member 340 that is opposite to a portion connected with the blocking member 310 has a locking protrusion 341 that is located in the blocking member 310 and is interfered with and moved by the moving lock member 360 to be stopped by an inner wall (various structures such as a locking hole or a locking groove are possible) of the USB port 10. Such a locking member 340 is selectively interfered with or released by the lock member 360 to perform a locking operation or a unlocking operation. In other words, as shown in FIG. 6, if the lock member 360 is pulled out from the blocking member 310, the free end of the locking member 340, which is interfered with by the lock member 360 and then is moved outwards, restores to its original position, so that the locking member is inserted into the blocking member 310 and is unlocked from the inner wall 11 of the electronic device 1, and thereby it is possible to separate the blocking member 310 from the USB port 10.

The stopping member 350 blocks the unauthorized external USB connection port from being inserted into the external USB port part 320. Here, the pre-authorized external USB connection port 410 is an external USB connection port that is previously coupled to the external USB port part 320 before the locking member 340 and the stopping member 350 are located at the locking position and the lock position, respectively, by pushing the lock member 360 after the blocking member 310 is inserted into the USB port 10 of the electronic device 1. That is, as shown in FIG. 6, the pre-authorized external USB connection port 410 is the USB connection port to which the external USB connection port 410 coupled to the external USB port part 320 is applied.

Thus, the external USB connection port 420, which is not previously coupled to the external USB port part 320 but is to be later coupled thereto (after the lock member is pushed into the blocking member to be coupled thereto as shown in FIG. 5A), is considered to be unauthorized. As shown in FIG. 5A, its access to the external USB port part 320 is blocked by the stopping member 350.

Figure 5B:
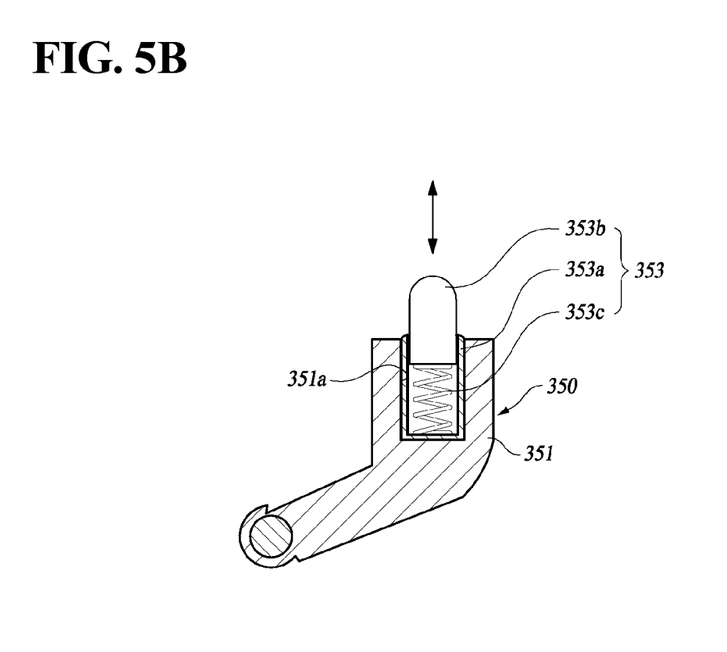
FIG. 5B is an extracted sectional view showing important parts of FIG. 5A.

The stopping member 350 may include a rotary member 351 that is rotatably connected at a first end thereof to the lock member 360 and is bent at a second end thereof at a predetermined angle towards the external USB port part 320, and a movable member that is retractably provided on the second end of the rotary member 351. A coupling hole 351a is formed in the second end of the rotary member 351 such that the movable member 353 is insertively coupled thereto. Referring to FIGS. 5A and 5B, the movable member 353 includes a guide pipe 353a inserted into a coupling hole 351a, a blocking pin 353b provided to be movable into and out of the guide pipe 353a, and a spring 353c biasing the blocking pin 353b to cause the blocking pin 353b to protrude out from the guide pipe 353a. The spring 353c is installed in the guide pipe 353a to bias the blocking pin 353b and thereby cause it to protrude out. Such a configuration allows only the blocking pin 353b to protrude out as shown in FIG. 5A, in the state where the movable member 353 is inserted into the coupling hole 351a of the rotary member 351.

Figure 7:
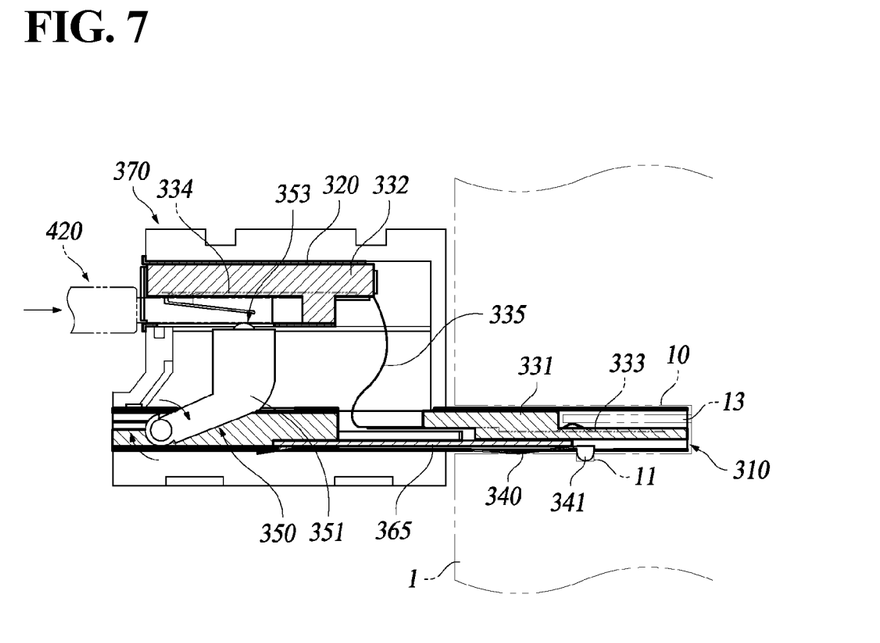
FIG. 7 is a sectional view showing the USB link lock device connected to the USB port of the electronic device with an external USB connection port being connected thereto.

Meanwhile, if the lock member 360 is pushed into the blocking member 310 in the state where the authorized external USB connection port 410 is inserted into the external USB port part 320 as shown in FIG. 6, the rotary member 351 rotatably comes into contact with the edge of the guide hole 382 of the guide cover 380, namely, the guide part 383 as shown in FIG. 7. At this time, the blocking pin 353b of the movable member 353 comes into contact with the authorized external USB connection port 410 that is previously inserted into the external USB port part 320, and then is pushed into the coupling hole 351a of the rotary member 351.

Further, if the external USB port part 320 is pulled out while the authorized external USB connection port 410 is being used as such, as shown in FIG. 5A, the blocking pin 353b is biased by the spring 353c to protrude into the external USB port part 320. Thus, in such a state, if the unauthorized external USB connection port 420 is put into the external USB port part 320, the unauthorized external USB connection port 420 is blocked by the blocking pin 353b, so that it is not completely inserted and the use of the unauthorized USB connection port 420 is prevented.

Here, the guide cover 380 is fixedly coupled to the blocking member 310 to partially cover an open top of the guide part 310b of the blocking member 310. That is, after the lock member 360 is mounted to the guide part 310b, the guide cover 380 is fixedly coupled to the blocking member 310 to cover the top of the guide part. At this time, during the movement of the lock member 360, the rotary member 351 protrudes out of the blocking member 310. In order to guide the rotation of the rotary member 351 depending on a moving position, the passing hole 382 is formed in the guide cover 380. By the edge of the passing hole 382, namely, the guide part 383, the rotary member 351 may be guided depending on the moving position to change the rotating angle. In order to fixedly couple the guide cover 380 to the blocking member 310, a plurality of locking holes is formed in the guide cover 380 and the locking protrusion 315 protrudes from a side surface 313 of the blocking member 310.

The lock member 360 is retractably installed in the blocking member 310. When the lock member 360 is inserted into the blocking member 310, the locking member 340 is operated in conjunction with the stopping member 350, thus controlling the locking operation of the locking member 340 and the blocking operation of the stopping member 350. Such a lock member 360 includes a frame 361 that is retractably provided to slide in and out of the blocking member 310, an internal space 363 that is provided in the frame 361 and rotatably supports the rotary member 351, and a locking-member interference member 365 that is supported between the internal structure 363 and the frame 361.

The frame 361 has the shape of a rectangular frame that is open at both ends thereof, and is formed of a metal material. The internal space 363 is coupled to the interior of the frame 361. A rotating shaft 363a to which the first end of the interference member is rotatably connected is formed in the internal structure 363. The first end of the locking-member interference member 365 is provided between the internal space 363 and the frame 361. A portion of the locking-member interference member 365 that is exposed to the outside of the frame 361 interferes with the locking member 340 during the movement of the lock member 360, thus controlling the locking operation as shown in FIG. 5A.

In the state where the frame 361 is mounted in the interference member, the frame 361 is covered by the guide cover 380. A passing hole 361a is formed in the frame 361 to allow the rotary member 351 to pass therethrough. Further, a guide protrusion 361b protrudes to correspond to the guide hole 311a formed in a surface of the frame 361, namely, the lower surface 311 of the blocking member 310. If the frame 361 is reciprocated with the guide protrusion 361b being inserted into the guide hole 311a, the moving distance of the guide protrusion 361b along the guide hole 311a is limited, thus consequently preventing the frame 361 from being removed from the blocking member 310.

Figure 8:
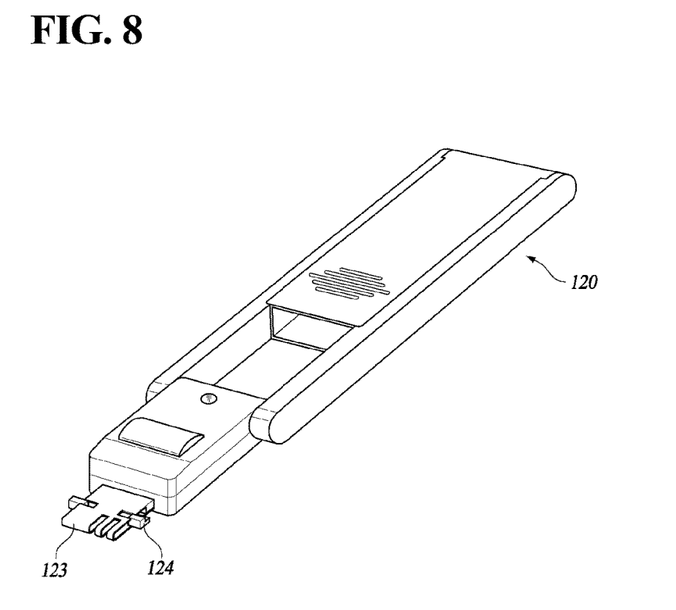
FIG. 8 is a perspective view showing a lock key unit.

The internal structure 363 is coupled to occupy a given space in the frame 361. A key hole 363b is formed in a front surface of the internal structure 363, and a fixing key 123 and a latch key 124 of the release key unit 120 as shown in FIG. 8 are insertively coupled to the key hole 363a. Further, the rotating shaft 363a to which the first end of the interference member is rotatably connected is formed on the side surface of the internal structure 363.

The first end of the locking-member interference member 365 is fixedly fitted between the internal structure 363 and the frame 361, while the second end of the locking-member interference member 365 protrudes out of the frame 361 to extend a predetermined length. As shown in FIG. 6, such a locking-member interference member 365 does not interfere with the locking member 340 in the state where the lock member 360 protrudes out of the blocking member 310, thus keeping the locking member 340 unlocked from the locking hole 11. In contrast, if the lock member 360 is pushed from the state of FIG. 6 to the state of FIG. 5A, the locking-member interference member 365 interferes with the locking member 340, and the locking member 340 is pushed by the locking-member interference member 365 to be elastically deformed, such that the locking protrusion 341 is insertively locked to the locking hole 11. Thus, in such a state, the blocking member 310 is fixedly inserted into the USB port 10 of the electronic device 1, so that its removal is prevented.

Further, since the allowed release key unit 120 should be used to pull the lock member 360 out in the state of FIG. 5A and unlock the locking member 340, an outsider cannot pull the lock member 360 out to release the locking state.

The operational effect of the USB link lock device according to the embodiment of the present invention configured as described above will be described in detail.

First, as shown in FIG. 6, in the state where the authorized external USB connection port 410 is inserted into the external USB port part 320, the blocking member 310 is inserted into the USB port 10 of the electronic device 1 to be temporarily coupled thereto. In this state, if the lock member 360 is pushed into the blocking member 310, the locking member 340 is interfered with by the locking-member interference member 365 to be locked to the USB port 10 of the electronic device 1 and secured to the electronic device.

Further, while the lock member 360 is inserted into the blocking member 310, the rotary member 351 rotatably comes into contact with the guide part 383 of the guide cover 380. At this time, the blocking pin 353b of the movable member 353 comes into contact with the authorized external USB connection port 410 that is previously inserted into the external USB port part 320, and then is pushed into the coupling hole 351a of the rotary member 351 to assume the state of FIG. 7.

Further, if the authorized external USB connection port 410 which is being used as such is removed from the external USB port part 320, as shown in FIG. 5A, the blocking pin 353b is biased by the spring 353c to protrude into the external USB port part 320. Thus, in such a state, if the unauthorized external USB connection port 420 is put into the external USB port part 320, it is stopped by the blocking pin 353b and then is not completely inserted, so that it is impossible to use the unauthorized USB connection port 420.

As such, the operation of pushing the lock member 60 therein prevents the forced removal of the blocking member 310. If the unauthorized external USB connection port (a memory device, a USB cable or the like) is inserted, its insertion is completely prevented by the stopping member 350, thus consequently making it impossible to perform connection in such a way as to transmit a signal to the electronic device 1.

Meanwhile, in order to separate the blocking member 310 from the electronic device 1, the lock member 360 should be moved to an initial position, namely, moved to be exposed to an outside of the blocking member 310. In this case, it is possible to pull the lock member 360 out using the release key unit 120, and it is impossible to pull the lock member 360 out using other tools.

According to the USB link lock device 300 of the present invention, when outside personnel for maintenance and development access a server having a confidential document, it is impossible to separate the inserted authorized port without the inherent release key unit, so that it is possible to control the illegal approach of outside personnel. That is, if the external USB terminal is connected to the PC or the server of protective equipment via the USB link lock device 300 of the present invention, and the USB link lock device is also connected to the USB port of a connected notebook computer or other portable data media, the separation of the USB port is possible only when an administrator performs a releasing operation with the release key unit.

Further, even when the keyboard or the mouse is connected to the external USB port part, it is possible to essentially block the unauthorized external USB connection port from being inserted into a portion from which the pre-authorized keyboard or mouse is pulled, thus further improving the security of the electronic device 1. Furthermore, even in the case of blocking the plurality of USB ports, which are proximate to each other, the present invention allows the thickness of the USB link lock device to be minimized, thus enabling very effective use.

Here, FIG. 8 illustrates the structure of a lock key unit 120. A method of separating the USB link lock device 300 from the USB port 10 of the electronic device 1 using the lock key unit 120 is the same as a method of taking the lock member 360 out from the blocking member 310. Further, a structure for fitting the lock key unit 120 into the lock member 360 to take it out, namely, the key hole 363b and the fixing key 123 and the latch key 124 of the lock key unit 120 may be designed in various structures and shapes. The present invention are not limited by the structures and shapes.

Although the embodiments of the present invention have been disclosed for illustrative purposes, those skilled in the art will appreciate that various modifications, additions and substitutions are possible, without departing from the scope and spirit of the invention as disclosed in the accompanying claims.

DESCRIPTION OF REFERENCE NUMERALS
OF IMPORTANT PARTS

300 . . . USB link lock device
310 . . . blocking member
320 . . . USB port part
330 . . . signal connection part
340 . . . locking member
350 . . . stopping member
360 . . . lock member

The invention claimed is:
1. A USB link lock device, comprising:
a device body;
a blocking member provided on the device body, and insertively coupled to an USB port of an electronic device to block access of an external device;
an external USB port part provided on the device body to be adjacent to the blocking member, an external USB connection port being insertively coupled to the external USB port part;
a signal connection part enabling signal transmission between a terminal inside the USB port of the electronic device into which the blocking member is inserted and the external USB connecting port inserted into the external USB port part;
a locking member selectively locked to the electronic device so that the blocking member is not forcedly removed in a state of being inserted into the USB port of the electronic device;
a stopping member provided in the device body to be retractable into the external USB port part, and selectively blocking an unauthorized external USB connecting port from being inserted into the external USB port part; and
a lock member movably provided on the blocking member, and interfering with the locking member depending on a moving position to control a locking operation of the locking member, supporting the stopping member to change a posture of the stopping member depending on the moving position and thereby control a blocking operation of the stopping member,
wherein the blocking member comprises: a port insertion part provided on a first end thereof to protrude out from the device body, and having a shape corresponding to that of the USB port of the electronic device to be inserted into the USB port of the electronic device; and a guide part extending from the port insertion part and provided in the device body, with the lock member movably installed therein to be retractable through a second end,
wherein the external USB port part is provided in the device body to be spaced apart from the blocking member, and has an elastic support piece elastically supporting the external USB connection port that enters therein, and
a passing hole is formed in the external USB port part to allow the stopping member to enter therein.
2. The USB link lock device according to claim 1, wherein the locking member is integrally connected to the blocking member to be elastically deformable and restorable, and has a locking protrusion that is interfered with and deformed by a movement of the lock member, in a state where the port insertion part is inserted into the USB port of the electronic device, and is protruded out of the port insertion part to be locked to a locking hole formed in the USB port of the electronic device.
3. A USB link lock device, comprising:
a device body;
a blocking member provided on the device body, and insertively coupled to an USB port of an electronic device to block access of an external device;

an external USB port part provided on the device body to be adjacent to the blocking member, an external USB connection port being insertively coupled to the external USB port part;

a signal connection part enabling signal transmission between a terminal inside the USB port of the electronic device into which the blocking member is inserted and the external USB connecting port inserted into the external USB port part;

a locking member selectively locked to the electronic device so that the blocking member is not forcedly removed in a state of being inserted into the USB port of the electronic device;

a stopping member provided in the device body to be retractable into the external USB port part, and selectively blocking an unauthorized external USB connecting port from being inserted into the external USB port part; and a lock member movably provided on the blocking member, and interfering with the locking member depending on a moving position to control a locking operation of the locking member, supporting the stopping member to change a posture of the stopping member depending on the moving position and thereby control a blocking operation of the stopping member, wherein the blocking member comprises: a port insertion part provided on a first end thereof to protrude out from the device body, and having a shape corresponding to that of the USB port of the electronic device to be inserted into the USB port of the electronic device; and a guide part extending from the port insertion part and provided in the device body, with the lock member movably installed therein to be retractable through a second end, wherein a first end of the stopping member is rotatably connected to the lock member, and a second end of the stopping member is changed in posture when the lock member is inserted and then is moved to an internal space of the external USB port part, thus blocking a unauthorized external USB connection port from being inserted into the external USB port part.

4. A USB link lock device, comprising:
a device body;
a blocking member provided on the device body, and insertively coupled to an USB port of an electronic device to block access of an external device;
an external USB port part provided on the device body to be adjacent to the blocking member, an external USB connection port being insertively coupled to the external USB port part;
a signal connection part enabling signal transmission between a terminal inside the USB port of the electronic device into which the blocking member is inserted and the external USB connecting port inserted into the external USB port part;
a locking member selectively locked to the electronic device so that the blocking member is not forcedly removed in a state of being inserted into the USB port of the electronic device;
a stopping member provided in the device body to be retractable into the external USB port part, and selectively blocking an unauthorized external USB connecting port from being inserted into the external USB port part; and
a lock member movably provided on the blocking member, and interfering with the locking member depending on a moving position to control a locking operation of the locking member, supporting the stopping member to change a posture of the stopping member depending on the moving position and thereby control a blocking operation of the stopping member, wherein the blocking member comprises: a port insertion part provided on a first end thereof to protrude out from the device body, and having a shape corresponding to that of the USB port of the electronic device to be inserted into the USB port of the electronic device; and a guide part extending from the port insertion part and provided in the device body, with the lock member movably installed therein to be retractable through a second end, wherein the stopping member comprises:
a rotary member rotatably connected at a first end thereof to the lock member, and bent at a second end thereof at a predetermined angle towards the external USB port part; and
a movable member retractably provided on the second end of the rotary member, and entering an interior of the external USB port part.

5. The USB link lock device according to claim 4, wherein the movable member comprises:
a guide pipe inserted into a coupling hole formed in the second end of the rotary member;
a blocking pin provided to be movable into and out of the guide pipe; and
a spring provided in the guide pipe to bias the blocking pin and thereby cause the blocking pin to protrude out from the guide pipe.

6. The USB link lock device according to claim 4, wherein the lock member comprises:
a frame retractably provided to slide in and out of the blocking member;
an internal space provided in the frame and rotatably supporting the rotary member; and
a locking-member interference member supported at a first end thereof between the internal structure and the frame, and extending at a second end thereof out of the frame, the locking-member interference member interfering with the locking member to be locked to an interior of the USB port of the electronic device when the lock member is inserted into the blocking member.

7. The USB link lock device according to claim 6, wherein a rotating shaft to which the first end of the stopping member is rotatably connected is formed on the internal structure of the lock member, and a passing hole through which the stopping member passes is formed in the frame.

8. The USB link lock device according to claim 6, further comprising:
a guide cover coupled to cover the blocking member to guide a movement of the lock member, and having a guide hole through which the stopping member connected to the lock member passes,
wherein the stopping member rotatably comes into contact with the guide part that is an edge of the guide hole when the lock member is inserted into the blocking member, and then enters the USB port part.

9. A USB link lock device, comprising:
a device body;
a blocking member provided on the device body, and insertively coupled to an USB port of an electronic device to block access of an external device;
an external USB port part provided on the device body to be adjacent to the blocking member, an external USB connection port being insertively coupled to the external USB port part;

a signal connection part enabling signal transmission between a terminal inside the USB port of the electronic device into which the blocking member is inserted and the external USB connecting port inserted into the external USB port part;

a locking member selectively locked to the electronic device so that the blocking member is not forcedly removed in a state of being inserted into the USB port of the electronic device;

a stopping member provided in the device body to be retractable into the external USB port part, and selectively blocking an unauthorized external USB connecting port from being inserted into the external USB port part; and a lock member movably provided on the blocking member, and interfering with the locking member depending on a moving position to control a locking operation of the locking member, supporting the stopping member to change a posture of the stopping member depending on the moving position and thereby control a blocking operation of the stopping member, wherein the signal connection part comprises:
a first internal structure provided in the blocking member;
a second internal structure provided in the external USB port part;
first and second connection terminals embedded in the first and second internal structures, respectively; and
a terminal connecting member extending from the external USB port part to the blocking member to connect the first and second connection terminals to each other.

* * * * *